United States Patent
Kefei

(10) Patent No.: US 9,812,739 B2
(45) Date of Patent: Nov. 7, 2017

(54) ELECTROLYTE ADDITIVE AND USE THEREOF IN LITHIUM-ION BATTERY

(71) Applicant: NingDe Amperex Technology Limited, NingDe (CN)

(72) Inventor: Wang Kefei, NingDe (CN)

(73) Assignee: NINGDE AMPEREX TECHNOLOGY LIMITED, NingDe (CN)

( * ) Notice: Subject to any disclaimer, the term of this patent is extended or adjusted under 35 U.S.C. 154(b) by 0 days.

(21) Appl. No.: 15/076,410

(22) Filed: Mar. 21, 2016

(65) Prior Publication Data

US 2016/0294007 A1    Oct. 6, 2016

(30) Foreign Application Priority Data

Mar. 31, 2015    (CN) .......................... 2015 1 0147276

(51) Int. Cl.
  *H01M 10/052*    (2010.01)
  *H01M 10/0567*   (2010.01)
  *H01M 10/42*     (2006.01)

(52) U.S. Cl.
  CPC ..... *H01M 10/4235* (2013.01); *H01M 10/052* (2013.01); *H01M 10/0567* (2013.01); *H01M 2300/0025* (2013.01)

(58) Field of Classification Search
  CPC ........... H01M 10/052; H01M 10/0566; H01M 10/0567; H01M 10/0568; H01M 2300/0025
  See application file for complete search history.

(56) References Cited

U.S. PATENT DOCUMENTS

| | | | | |
|---|---|---|---|---|
| 2012/0009487 A1* | 1/2012 | Hwang | ............... | H01M 10/052 429/338 |
| 2014/0072865 A1* | 3/2014 | Suh | ................... | H01M 10/0567 429/188 |
| 2014/0134461 A1* | 5/2014 | Inoue | ..................... | H01M 2/26 429/7 |

FOREIGN PATENT DOCUMENTS

| | | | |
|---|---|---|---|
| JP | 2009-158464 | * | 7/2009 |
| WO | WO 2013/005521 | * | 1/2013 |
| WO | WO2013/033595 | * | 3/2013 |

OTHER PUBLICATIONS

Machine translation of JP 2009-158464, published on Jul. 16, 2009.*

\* cited by examiner

*Primary Examiner* — Anca Eoff

(74) *Attorney, Agent, or Firm* — Arent Fox LLP

(57) ABSTRACT

The present disclosure discloses an electrolyte additive and its use in a lithium-ion battery. The lithium-ion battery may include an electrolyte solution. The electrolyte solution may include an organic solvent, a lithium salt, and an electrolyte additive. The electrolyte additive may comprise a multi-nitrile compound and a sulfur-oxygen double bond-containing compound. The use of the electrolyte additive in a lithium-ion battery enables the lithium-ion battery to maintain a good cycle life, low-temperature discharge characteristics, and high-temperature storage characteristics even at a high voltage.

11 Claims, 3 Drawing Sheets

Table 1

| Electrolyte solutions No. | Solvent ingredients & weight percent | | | | Type and percent (%) by weight of additives in electrolytes | | | | | | | Lithium salt & concentration |
|---|---|---|---|---|---|---|---|---|---|---|---|---|
| | EC | PC | DEC | EP | PTN | BPN | ADN | DTD | MMDS | VC | | LiPF$_6$ (mol/L) |
| DL1 | 1 | 1 | | 2 | | | | | | 1 | | 1 |
| DL2 | 1 | 1 | | 2 | 0.1 | | | | | 1 | | 1 |
| DL3 | 1 | 1 | | 2 | 2 | | | | | 1 | | 1 |
| DL4 | 1 | 1 | | 2 | | | 2 | | | 1 | | 1 |
| DL5 | 1 | 1 | | 2 | | | 2 | | | 1 | | 1 |
| DL6 | 1 | 1 | | 2 | 2 | | | | | 1 | | 1 |
| L1 | 1 | 1 | | 2 | 0.1 | | | 1 | | 1 | | 1 |
| L2 | 1 | 1 | | 2 | 1 | | | 1 | | 1 | | 1 |
| L3 | 1 | 1 | | 2 | 2 | | | 1 | | 1 | | 1 |
| L4 | 1 | 1 | | 2 | 4 | | | 1 | | 1 | | 1 |
| L5 | 1 | 1 | | 2 | 4.5 | | | 1 | | 1 | | 1 |
| L6 | 1 | 1 | | 2 | 3 | | | | 0.1 | 1 | | 1 |
| L7 | 1 | 1 | | 2 | 3 | | | | 2 | 1 | | 1 |
| L8 | 1 | 1 | | 2 | 3 | | | | 4 | 1 | | 1 |
| L9 | 1 | 1 | | 2 | 3 | | | | 7 | 1 | | 1 |
| L10 | 1 | 1 | 1 | 2 | 3 | 1 | | 1 | | 1 | | 1 |
| L11 | 1 | 1 | 1 | 2 | 2 | 1 | | 1 | | 1 | | 1 |
| L12 | 1 | 1 | 1 | 2 | | 3 | | 0.5 | 0.5 | 1 | | 1 |
| L13 | 1 | 1 | 1 | 2 | | 3 | | 1 | 0.5 | 1 | | 1 |
| L14 | 1 | 1 | 1 | 2 | 2 | 2 | | 1 | 0.5 | 1 | | 1 |
| L15 | 1 | 1 | 1 | 2 | 2 | 2 | | 1 | 0.5 | 0.1 | | 1 |
| L16 | 1 | 1 | 1 | 2 | 2 | 2 | | 1 | 0.5 | 0.5 | | 1 |
| L17 | 1 | 1 | 1 | 2 | 2 | 2 | | 1 | 0.5 | 2 | | 1 |
| L18 | 1 | 1 | 1 | 2 | 2 | 2 | | 1 | 0.5 | | | 1 |

FIG. 1

Table 2

| Battery No. | thickness expansion rate (%) | | High-temperature storage performance ||||| 
|---|---|---|---|---|---|---|---|
| | | | internal resistance increase rate (%) | | residual capacity retention rate (%) | | restoration capacity ratio (%) |
| | 20 d | 35 d | 20 d | 35 d | 20 d | 35 d | 35 d |
| DC1 | 68.3 | 118.3 | 52.2 | 92.6 | 38.7 | | 40.5 |
| DC2 | 24.2 | 41.2 | 36.3 | 50.2 | 67.7 | | 76.6 |
| DC3 | 21.8 | 39.1 | 34.3 | 46.8 | 64.4 | | 67.3 |
| DC4 | 15.2 | 24.2 | 36.7 | 51.3 | 68.6 | | 69.5 |
| DC5 | 24.5 | 41.5 | 36.6 | 50.5 | 68.7 | | 76.9 |
| DC6 | 25.2 | 42.3 | 37.4 | 51.3 | 57.7 | | 66.6 |
| C1 | 13.6 | 19.2 | 25.4 | 37.7 | 86.3 | | 88.1 |
| C2 | 7.6 | 14.1 | 19.7 | 30.5 | 87.4 | | 88.3 |
| C3 | 6.1 | 7.4 | 19.1 | 29.3 | 87.5 | | 88.8 |
| C4 | 5.9 | 7.1 | 18.9 | 28.9 | 88.8 | | 89.2 |
| C5 | 5.7 | 7.1 | 17.5 | 28.7 | 90.2 | | 91.2 |
| C6 | 7.8 | 9.6 | 20.6 | 29.8 | 88.7 | | 89.7 |
| C7 | 7.6 | 9.4 | 20.0 | 29.4 | 89.7 | | 90.9 |
| C8 | 5.0 | 8.2 | 19.5 | 30.3 | 90.6 | | 91.4 |
| C9 | 4.9 | 7.4 | 19.9 | 27.5 | 89.0 | | 91.2 |
| C10 | 3.2 | 5.8 | 16.3 | 26.4 | 90.6 | | 91.5 |
| C11 | 4.8 | 7.6 | 18.1 | 25.9 | 90.2 | | 91.1 |
| C12 | 3.0 | 5.6 | 15.9 | 26.6 | 88.9 | | 90.0 |
| C13 | 4.2 | 5.7 | 16.9 | 28.2 | 88.8 | | 89.7 |
| C14 | 4.1 | 5.3 | 15.8 | 25.9 | 90.2 | | 91.1 |
| C15 | 4.0 | 6.6 | 17.9 | 28.6 | 88.9 | | 89.2 |
| C16 | 5.2 | 6.9 | 18.2 | 26.9 | 87.7 | | 90.0 |
| C17 | 9.2 | 16.7 | 21.9 | 35.2 | 88.8 | | 89.7 |
| C18 | 3.8 | 5.6 | 16.5 | 27.3 | 89.2 | | 90.1 |

FIG. 2

Table 3

| Battery No. | Cycle performance | | | | | | |
|---|---|---|---|---|---|---|---|
| | Capacity retention rate after n cycles at 45°C (%) | | | Capacity retention rate after n cycles of intermittent charge at 50°C (%) | | | |
| | 50 cycles | 100 cycles | 200 cycles | 300 cycles | 10 | 30 | 50 | 100 |
| DC1 | 45.7 | 21.2 | 15.1 | / | 82.6 | 70.8 | 58.5 | 25.5 |
| DC2 | 60.3 | 55.5 | 40.7 | 20.9 | 84.5 | 69.8 | 60.3 | 35.5 |
| DC3 | 55.3 | 41.5 | 37.4 | 22.1 | 85.5 | 63.1 | 58.5 | 37 |
| DC4 | 64.5 | 49.4 | 42.7 | 40.5 | 87.1 | 70.7 | 65.6 | 43.4 |
| DC5 | 63.3 | 58.5 | 43.7 | 23.9 | 87.5 | 72.8 | 63.3 | 38.5 |
| DC6 | 54.3 | 49.5 | 34.7 | 14.9 | 77.5 | 62.8 | 53.3 | 28.5 |
| C1 | 92.5 | 88.9 | 85.9 | 79.0 | 93 | 88.4 | 83.4 | 80 |
| C2 | 94.8 | 93.2 | 90.7 | 86.9 | 93.5 | 88.8 | 83.8 | 80.4 |
| C3 | 97.0 | 94.5 | 92.6 | 90.6 | 94 | 89.3 | 84.3 | 80.8 |
| C4 | 96.6 | 93.6 | 92.3 | 88.9 | 93.2 | 88.5 | 82.8 | 78.6 |
| C5 | 93.2 | 90.9 | 88.4 | 83.8 | 91.2 | 86.7 | 81.1 | 76.9 |
| C6 | 95.6 | 91.7 | 90.6 | 85.3 | 91 | 86.6 | 81 | 76.9 |
| C7 | 96.3 | 91.8 | 89.9 | 85.8 | 92.1 | 87.6 | 81.9 | 77.8 |
| C8 | 97.6 | 93.0 | 90.0 | 86.4 | 92.2 | 88.5 | 82.8 | 77.6 |
| C9 | 94.0 | 89.9 | 89.1 | 85.1 | 91.2 | 86.8 | 81.2 | 77.1 |
| C10 | 96.7 | 92.4 | 91.1 | 88.2 | 91.9 | 86.4 | 80.7 | 76.6 |
| C11 | 97.0 | 93.5 | 91.4 | 89.5 | 91.8 | 87.2 | 82.3 | 79 |
| C12 | 97.2 | 93.3 | 92.1 | 87.4 | 93.9 | 89.2 | 84.3 | 80.7 |
| C13 | 97.4 | 94.3 | 93.3 | 87.5 | 93.2 | 88.5 | 83.6 | 80.2 |
| C14 | 97.0 | 93.5 | 91.4 | 89.5 | 91.9 | 86.4 | 80.7 | 76.6 |
| C15 | 93.3 | 89.5 | 88.3 | 83.7 | 92.2 | 88.5 | 83.6 | 80.2 |
| C16 | 95.4 | 92.3 | 91.3 | 85.5 | 90 | 85.5 | 80.7 | 77.4 |
| C17 | 97.2 | 94.4 | 91.3 | 89.7 | 87.3 | 83.6 | 76.9 | 65.3 |
| C18 | 92.5 | 88.5 | 87.1 | 80.0 | 92.2 | 88.5 | 83.6 | 80.2 |

FIG. 3

ELECTROLYTE ADDITIVE AND USE THEREOF IN LITHIUM-ION BATTERY

CROSS-REFERENCE TO RELATED APPLICATION

This application claims the benefit of Chinese Patent Application No. 201510147276.7, entitled "ELECTROLYTE ADDITIVE AND USE THEREOF IN LITHIUM-ION BATTERY" and filed on Mar. 31, 2015 in the State Intellectual Property Office of the People's Republic of China (PRC) (SIPO), the disclosure of which is expressly incorporated by reference herein in its entirety.

BACKGROUND

Field

The present disclosure relates generally to the field of lithium-ion batteries, and more particularly, to an electrolyte additive.

Background

Along with the rapid development of smart electronic products over recent years, increasingly high requirements have been imposed on the battery life of lithium-ion batteries. Developing high-voltage lithium-ion batteries is one effective way to improve the energy density of lithium-ion batteries.

At present, lithium-ion batteries with working voltage above 4.35 V have become a hot research topic of numerous research institutes and businesses. At a high voltage, however, oxidative activity increases and stability decreases for the materials forming the positive electrode (cathode). Increased oxidative activity and decreased stability may cause a non-aqueous electrolyte to undergo electrochemical oxidation on the positive electrode surface and then to decompose to produce gases. At the same time, transition metal elements (e.g. nickel, cobalt, manganese, etc.) in the materials forming the positive electrode (cathode) may undergo reduction reaction and dissolve out, causing electrochemical properties of the lithium-ion battery to deteriorate further. At present, the main solution is to add a film-forming additive into the electrolyte. Such an additive can form a film on the positive electrode, which, however, may cause the interface resistance to increase, leading to decreased migration and diffusion kinetic capability of lithium-ions in the battery, and further to a decayed C-rate (charge and discharge rates) and cycle performance of the battery. For example, the film-forming additive may cause the discharge rate to decrease, which is to say that if we use the same discharge rate, it can cause lower capacity.

As a result, there is a need for developing an electrolyte additive that enables the lithium-ion battery to maintain a good cycle life, low-temperature discharge characteristics, and high-temperature storage characteristics even at a high voltage.

SUMMARY

According to one aspect of the present disclosure, an electrolyte additive is provided. Said electrolyte additive may be used in a lithium-ion battery and capable of enabling the lithium-ion battery to maintain a good cycle life, low-temperature discharge characteristics, and high-temperature storage characteristics even at a high voltage.

The electrolyte additive may comprise a multi-nitrile compound and a sulfur-oxygen double bond-containing compound.

The multi-nitrile compound may be at least one compound selected from the group consisting of a compound having a chemical structural formula shown by Formula I and a compound having a chemical structural formula shown by Formula II:

Formula I where, $A_{11}$ and $A_{12}$ may be groups with 1 to 10 carbon atoms; each of $A_{11}$ and $A_{12}$ may be one group independently selected from the group consisting of a straight chain alkylene group, a straight chain group containing oxygen and/or halogen elements, an alkylene group having saturated branches, and a group containing oxygen and/or halogen elements and saturated branches;

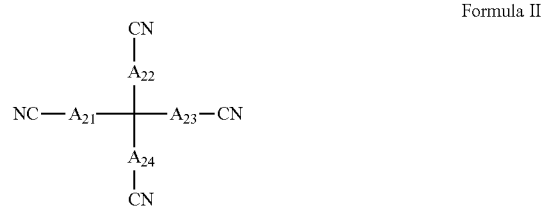

Formula II where, $A_{21}$, $A_{22}$, $A_{23}$ and $A_{24}$ may be groups with 1 to 10 carbon atoms; each of $A_{21}$, $A_{22}$, $A_{23}$ and $A_{24}$ may be independently selected from the group consisting of an alkylene group and a group containing oxygen and/or halogen elements.

In one aspect, $A_{11}$ and $A_{12}$ in said Formula I are groups with 1 to 8 carbon atoms.

Said alkylene group may be a group formed by a hydrocarbon compound losing any two hydrogen atoms. The hydrocarbon compound may include alkanes, cycloalkanes, alkenes, alkynes, and aromatic hydrocarbons. Said straight chain alkylene group may be a group formed by a straight chain hydrocarbon compound with two carbon atoms on two terminals of the molecular chain, each of the two carbon atoms losing one hydrogen atom. Said straight chain alkylene group may be a group formed by straight chain alkane with two carbon atoms on two terminals of the molecular chain, each of the two carbon atoms losing one hydrogen atom. Said alkylene group having saturated branches may refer to an alkylene group having a branch that does not have unsaturated bonds.

Said oxygen-containing group may refer to a group formed by any aldehyde compounds, ether compounds, lipid compounds, or alcohol compounds losing two hydrogen atoms. Said oxygen-containing straight chain group may refer to a group formed by any straight chain aldehyde compounds, ether compounds, lipid compounds, or alcohol compounds with carbon atoms and/or oxygen atoms on two terminals of the molecular chain, each of the carbon atoms and/or oxygen atoms losing one hydrogen atom. In one aspect, said oxygen-containing straight chain group may be selected from -A-O- or -A-O-A-, A being a straight chain alkylene group. Said group that contains oxygen and has a saturated branch may refer to a group containing oxygen and having a branch where the branch does not have unsaturated bonds.

Said halogen element-containing group may refer to a group formed by an alkylene group with at least one hydrogen atom substituted by a halogen element. Said halogen element-containing straight chain group may refer to a group formed by a straight chain alkylene group with at least one hydrogen atom substituted by a halogen element. Said group that contains a halogen element and has a saturated branch may refer to a group formed by an alkylene group having a saturated branch with at least one hydrogen atom substituted by a halogen element.

Said oxygen and halogen element-containing group may refer to a group formed by an oxygen-containing group with at least one hydrogen atom substituted by a halogen element. Said oxygen and halogen element-containing straight chain group may refer to a group formed by an oxygen-containing straight chain group with at least one hydrogen atom substituted by a halogen element.

The trinitrile or tetranitrile compound according to the present disclosure can provide lone pair electrons to a sulfur-oxygen double bond-containing compound, and accelerate the film forming thereof on the negative electrode (anode) surface. After a film is formed, the trinitrile or tetranitrile compound will attach to the negative electrode surface, which slows down, to certain extent, the continuing film-forming in the film-formed region and speeds up the film-forming in the region with no film formed. This may achieve the even formation of the film while improving the stability of the solid electrolyte interface film (hereinafter the "SEI film"), thereby improving the performance of a cell.

In one aspect, the sulfur-oxygen double bond-containing compound may be at least one compound selected from the group consisting of compounds having chemical structural formulas including the chemical structural formula shown by Formula III:

Formula III

In one aspect, the multi-nitrile compound may be at least one compound selected from the group consisting of hexane-1,3,6-tricarbonitrile, propane-1,2,3-tricarbonitrile, pentane-1,3,5-tricarbonitrile, 3,3-bis(cyanomethyl) pentane dinitrile, and 3,3-bis(cyanomethyl) adipic dinitrile.

In one aspect, the sulfur-oxygen double bond-containing compound may be at least one compound selected from the group consisting of cyclosulfite, saturated sultone, unsaturated sultone, and non-cyclosulfone. Further, in one aspect, the sulfur-oxygen double bond-containing compound may be at least one compound selected from the group consisting of methylene methanedisulfonate, ethylene sulfate, propylene sulfate, 1,3-propane sultone, 1,4-butane sultone, ethylene sultone, 1,3-propene sultone, 1,4-butene sultone, 1-methyl-1,3-propene sultone, divinyl sulfone, dimethyl sulfone, diethyl sulfone, methylethyl sulfone, and methylethylene sulfone.

In one aspect, the additive may further comprise a cyclic carbonate compound containing carbon-carbon unsaturated bonds. Further, in one aspect, the cyclic carbonate compound containing carbon-carbon unsaturated bonds may be at least one compound selected from the group consisting of vinylene carbonate, allylidene carbonate, fluoro vinylene carbonate, methylene ethylene carbonate, 1,2-difluoro vinylene carbonate, vinyl ethylene carbonate, and propylene ethylene carbonate.

According to another aspect of the present disclosure, an electrolyte solution is provided, which may comprise an organic solvent, a lithium salt, and an additive. The additive may be at least one electrolyte additive selected from any of the electrolyte additives described above.

In one aspect, the percent by weight of the multi-nitrile compound in the electrolyte solution may be 0.1% to 4.5%. Further, in one aspect, the range of the percent by weight of the multi-nitrile compound in the electrolyte solution may have an upper limit selected from 4.5%, 4%, and 3%, and a lower limit selected from 0.1%, 0.2%, 0.5%, 1%, and 2%. In a further aspect, the percent by weight of the multi-nitrile compound in the electrolyte solution may be 0.2 to 4.5%.

In one aspect, the percent by weight of the sulfur-oxygen double bond-containing compound in the electrolyte solution may be 0.1% to 7%. Further, in one aspect, the range of the percent by weight of the sulfur-oxygen double bond-containing compound in the electrolyte solution may have an upper limit selected from 7%, 6%, 5%, 4%, and 3%, and a lower limit selected from 0.1%, 0.2%, 1%, 1.5%, and 2%. In a further aspect, the percent by weight of the sulfur-oxygen double bond-containing compound in the electrolyte solution may be 0.2% to 7%.

In one aspect, the percent by weight of the cyclic carbonate compound containing carbon-carbon unsaturated bonds in the electrolyte solution may be 0.1 to 9%. Further, in one aspect, the percent by weight of the cyclic carbonate compound containing carbon-carbon unsaturated bonds in the electrolyte solution may be 0.1 to 2%.

In one aspect, the lithium salt may be at least one lithium salt selected from the group consisting of hexafluoro phosphates, lithium tetrafluoro borate, hexafluoro arsenates, lithium perchlorate, trifluoro sulphonyl lithium, lithium bis(trifluoromethanesulphonyl)imide, lithium bis(fluorosulphonyl)imide, and lithium tris(trifluoromethanesulphonyl) methide.

In one aspect, the concentration of the lithium salt (as measured by lithium element) in the electrolyte solution may be 0.5 mol/L to 3 mol/L.

In one aspect, the organic solvent may be at least one solvent selected from the group consisting of ethylene carbonate, propene carbonate, dimethyl carbonate, diethyl carbonate, methylethyl carbonate, γ-butyrolactone, methyl formate, ethyl formate, propyl formate, ethyl propionate, propyl propionate, butyl formate, butyl acetate, butyl propionate, butyl butyrate, and tetrahydrofuran.

According to a further aspect of the present disclosure, a lithium-ion battery is provided. The lithium-ion battery may comprise any one of the electrolyte additives described above or any of the electrolyte solutions described above.

The lithium-ion battery may comprise positive electrode collector and a cathode membrane coated onto the positive electrode collector, a negative electrode collector and an anode membrane coated onto the negative electrode collector, a separator, and an electrolyte solution.

The cathode membrane may comprise a positive electrode active material, a bonding agent, and a conductive agent.

The anode membrane may comprise an anode active material, a bonding agent, and a conductive agent.

In one aspect, the positive electrode active material may be at least one material selected from the group consisting of lithium cobalt oxide $LiCoO_2$, lithium-nickel-manganese-cobalt ternary material $Li(Co_xNi_yMn_{1-x-y})O_2$, ferrous phosphate lithium $LiFePO_4$, and lithium manganate $LiMn_2O_4$.

In one aspect, the negative electrode active material may be at least one material selected from the group consisting of graphite, silicon, and tin.

The advantageous effects of the present disclosure include but are not limited to:

(1) The additive according to the present disclosure comprises a multi-nitrile compound and a sulfur-oxygen double bond-containing compound. At a high voltage, the additive can improve the stability of the positive electrode material of a lithium-ion battery, inhibit the decomposition of an electrolyte on the positive electrode surface, improve the storage performance and cycle performance of a high-voltage lithium-ion battery.

(2) The additive according to the present disclosure comprises a multi-nitrile compound, a sulfur-oxygen double bond-containing compound, and a cyclic carbonate compound. The additive can reduce the thickness and resistance of SEI film on the negative electrode surface, thereby improving the high-temperature cycle performance and low-temperature discharge performance of a lithium-ion battery.

(3) The lithium-ion battery according to the present disclosure can work normally for a long period at a high voltage, and maintain excellent high-temperature storage performance, cycle performance, and C-rate performance.

BRIEF DESCRIPTION OF THE DRAWINGS

FIG. 1 is a diagram illustrating Table 1 that shows the relations between the electrolyte solutions numbers of the obtained electrolyte solutions and types and mixing ratios of organic solvents, types of the lithium salt and concentrations thereof in the electrolyte solutions, and types of additives and concentrations thereof in the electrolyte solutions.

FIG. 2 is a diagram illustrating Table 2 that lists testing results of C1 to C18 and DC1 to DC6.

FIG. 3 is a diagram illustrating Table 3 that lists the results of using average value of capacity retention rates after n cycles of 5 batteries of the same battery number as the capacity retention rate of said lithium-ion battery after n cycles.

DETAILED DESCRIPTION

The present disclosure and the advantageous effects of certain configurations will be further described in detail below with reference to the accompanying drawings and specific embodiments.

The present disclosure will be described in detail below with reference to the embodiments, but the present disclosure is not limited to these embodiments.

In an embodiment, a bonding agent polyvinylidene difluoride (PVDF) was purchased from Shenzhen Advanced Material Co., Ltd.; a thickening agent sodium carboxymethyl cellulose (CMC) was purchased from Zhengzhou Zhiyi Chemical Product Co., Ltd.; a bonding agent styrene-butadiene rubber (SBR) was purchased from LG Chemicals.

Electrochemical properties of batteries were measured with an Autolab electrochemistry workstation produced by Swiss Metrohm AG.

In an embodiment, solvents and additives are identified with the following short names: 3,3-bis(cyanomethyl)pentane dinitrile (BPN in short), hexane-1,3,6-tricarbonitrile (PTN in short), adipic dinitrile (ADN in short), methylene methanedisulfonate (MMDS in short), ethylene sulfate (DTD in short), vinylene carbonate (VC in short), ethylene carbonate (EC in short), propene carbonate (PC in short), diethyl carbonate (DEC in short), and ethyl propionate (EP in short).

Example 1

Preparation of Electrolyte Solutions L1 to L18

In a glove box under the argon protection, stir and mix homogeneously organic solvents according to certain ratios to obtain a solvent for electrolyte solutions. Slowly add a lithium salt, and when the lithium salt is dissolved, add additives, and stir homogeneously until there is no precipitate, suspended matter or stratification. Continue to stir for 1 hour and obtain the electrolyte solutions. The obtained electrolyte solutions are identified with electrolyte solutions numbers L1 to L18 depending on types and mixing ratios of organic solvents, types of the lithium salt and concentrations thereof in the electrolyte solutions, and types of additives and concentrations thereof in the electrolyte solutions.

FIG. 1 is a diagram illustrating Table 1 that shows the relations between the electrolyte solutions numbers of the obtained electrolyte solutions and types and mixing ratios of organic solvents, types of the lithium salt and concentrations thereof in the electrolyte solutions, and types of additives and concentrations thereof in the electrolyte solutions.

Comparison Example 1

Preparation of Electrolyte Solutions DL1 to DL6

The specific steps are the same as those in Example 1, and the obtained electrolyte solutions are identified with electrolyte solutions numbers DL1 to DL6 depending on types and mixing ratios of organic solvents, types of the lithium salt and concentrations thereof in the electrolyte solutions, and types of additives and concentrations thereof in the electrolyte solutions. See Table 1 in FIG. 1 for specific corresponding relations.

Example 2

Fabrication of a Lithium-Ion Battery

Preparation of a Positive Film

Disperse a positive electrode active material $LiCoO_2$, a conductive agent conductive carbon black Super-P, and a bonding agent polyvinylidene difluoride (PVDF in short, and the percent by weight of PVDF in the bonding agent may be 10%) uniformly in a solvent N-Methylpyrrolidone (NMP in short) to prepare a positive electrode paste. In the positive electrode paste, the solid content may be 75 wt %, and the solid ingredients include 96 wt % $LiCoO_2$, 2 wt % PVDF, and 2 wt % Super-P. Evenly spread the positive electrode paste onto a positive electrode collector aluminum foil with a thickness of 16 μm. The spread amount may be 0.018 $g/cm^2$. Subsequently, dry at 85° C. in an oven, then perform cold-pressing, trim edge, cut into sheets and divide into strips, and then dry at 85° C. in vacuum for 4 hours and weld electrode tabs, thereby obtaining a positive film.

Preparation of a Negative Film

Disperse a negative electrode active material artificial graphite, a conductive agent conductive carbon black Super-P, a thickening agent sodium carboxymethyl cellulose (CMC in short, and the percent by weight of CMC may be 1.5%)) and a bonding agent styrene-butadiene rubber (SBR in short, and the percent by weight of SBR in the bonding agent may be 50%) uniformly in deionized water to prepare a negative electrode paste. In the negative electrode paste, the solid content may be 50 wt %, and the solid ingredients include 96.5 wt % artificial graphite, 1.0 wt % Super-P, 1.0 wt % CMC, and 1.5 wt % SBR. Evenly spread the negative electrode paste onto a negative electrode collector copper foil with a thickness of 12 μm. The spread amount may be 0.0089 g/cm$^2$. Subsequently, dry at 85° C. in an oven, then perform cold-pressing, trim edge, cut into sheets and divide into strips, and then dry at 110° C. in vacuum for 4 hours and weld electrode tabs, thereby obtaining a negative film.

Fabrication of Rechargeable Lithium-Ion Batteries C1 to C18 and DC1 to DC6

Use a 12 μm polypropylene thin film as a separator.

Fold the positive film, the separator, and the negative film sequentially such that the separator may be disposed in the middle of the positive film and the negative film, and plays a role of isolation. And then wind to a square naked core with a thickness of 8 mm, a width of 60 mm, and a length of 130 mm. Place the square naked core into an aluminum bag, bake in vacuum at 75° C. for 10 hours, inject an electrolyte solution, package in vacuum, place undisturbed for 24 hours. Subsequently, charge, at a constant current of 0.1 C (160 mA), to 4.2 V, then charge at a constant voltage of 4.2 V until the current decreases to 0.05 C (80 mA), then discharge, at a constant current of 0.1 C (160 mA), to 3.0 V. Repeat the charging and discharging for 2 times, and lastly charge, at a constant current of 0.1 C (160 mA), to 3.8 V, thereby completing the fabrication of a rechargeable lithium-ion battery. Depending on the injected electrolyte solution, rechargeable lithium-ion batteries fabricated with electrolyte solutions L1 to L18 obtained in Example 1 are identified with battery numbers C1 to C18, respectively, and rechargeable lithium-ion batteries fabricated with electrolyte solutions DL1 to DL6 obtained in Comparison Example 1 are identified with battery numbers DC1 to DC6, respectively.

Example 3

Test of High-Temperature Storage Performance of the Lithium-Ion Batteries

Take 5 of each of rechargeable lithium-ion batteries fabricated in Example 2, C1 to C 18 and DC1 to DC6, perform high-temperature storage performance tests, and the specific method is: at 25° C., first charge the batteries, at a constant current of 0.5 C, to 4.45 V, further charge at a constant voltage of 4.45 V until the current is 0.05 C, then discharge the batteries, at a constant current of 0.5 C, to 3.0 V, and the discharge capacity at this time is a discharge capacity of a battery prior to high-temperature storage. Subsequently, charge the batteries, at a constant current of 0.5 C, to 4.45 V, continue to charge at a constant voltage of 4.45 V until the current is 0.05 C, and then place at 60° C. for 35 days. When the storage ends, discharge, at a constant current of 0.5 C, to 3.0 V, charge, at a constant current of 0.5 C, to 4.45 V, and continue to charge at a constant voltage of 4.45 V until the current is 0.05 C. Calculate thickness expansion rate, internal resistance increase rate, residual capacity retention rate, and restoration capacity ratio of the lithium-ion batteries.

thickness expansion rate=(4.45 V thickness after storage/3.85 V thickness−1)×100%;

internal resistance increase rate=(4.45 V internal resistance after storage/3.85 V internal resistance−1)×100%;

residual capacity retention rate=discharge capacity after storage/discharge capacity before storage× 100%;

restoration capacity ratio=charge capacity after storage/discharge capacity before storage×100%.

Use average values of thickness expansion rate, internal resistance increase rate, residual capacity retention rate, and restoration capacity ratio of 5 batteries of the same battery number as the thickness expansion rate, internal resistance increase rate, residual capacity retention rate, and restoration capacity ratio of said lithium-ion battery.

FIG. 2 is a diagram illustrating Table 2 that lists testing results of C1 to C18 and DC1 to DC6.

It can be seen from Table 2 that the lithium-ion batteries C 1 to C18 using electrolyte solutions having additives according to the present disclosure have relatively low thickness expansion rates and internal resistance increase rates, and relatively high residual capacity retention rates and restoration capacity ratios. As a result, the lithium-ion batteries have better high-temperature storage performance. Regarding the batteries DC1 to DC6 that use electrolyte solutions in the comparison example, the high-temperature storage performance is relatively poor, indicating that neither separate use of trinitrile/tetranitrile compounds nor combined use of a dinitrile compound adipic dinitrile with a sulfur-oxygen double bond-containing compound and a carbonate additive could achieve a good high-temperature storage performance. The trinitrile/tetranitrile compounds can demonstrate good high-temperature storage performance only when combined with a sulfur-oxygen double bond-containing compound.

It can be seen by comparing data of C1 to C5 that, as the PTN content increases, thickness expansion rates consistently decrease for the lithium-ion batteries after 20-day and 35-day storage, and internal resistance increase rates consistently decrease for the lithium-ion batteries after 20-day and 35-day storage; residual capacity retention rates and restoration capacity ratios consistently increase for the lithium-ion batteries after 35-day storage. This is mainly because PTN forms a more effective protective film on the positive electrode surface, and along with the content increase, the protective film becomes thicker, which improves the storage performance. It can be seen by comparing data of C6 to C9 that, as the MMDS content increases, thickness expansion rates consistently decrease for the lithium-ion batteries after 20-day and 35-day storage, and internal resistance increase rates decrease first and then increase for the lithium-ion batteries after 20-day and 35-day storage; residual capacity retention rates and restoration capacity ratios decrease first and then increase for the lithium-ion batteries after 35-day storage. This shows that MMDS can improve the high-temperature storage performance of lithium-ion batteries, because MMDS can participate in the formation of SEI film, thereby improving the high-temperature storage performance of lithium-ion batteries; but when the MMDS content is relatively high, the excess MMDS will decompose into organic sulfonate impurities, which instead affects the restoration of internal resistance and capacity of lithium-ion batteries during high-temperature storage. It can be seen by comparing data of C10 to C14 that the combined use of two types of nitriles with two types of sulfur-oxygen double bond-containing compounds have a better effect on improving the high-temperature storage performance, which is mainly because the two complement each other's film forming and there are fewer "holes" in all types of protective films. It can be seen by comparing data of C15 to C18 that, as the VC content increases, thickness expansion rates consistently increase for the lithium-ion batteries after 20-day and 35-day storage, and internal resistance increase rates consistently increase for the lithium-ion batteries after 20-day and 35-day storage; residual capacity retention rates and restoration capacity ratios consistently decrease for the lithium-ion batteries after 35-day storage. This is because it is easier to oxidize to produce $H_2O$ and $CO_2$ when there are more VC, and to produce HF by reacting with the lithium salt, which corrodes the positive film and the negative film, leading to the increase of thickness and internal resistance of lithium-ion batteries.

Example 4

Test of High-Temperature Cycle Performance of the Lithium-Ion Batteries

Take 5 of each of rechargeable lithium-ion batteries fabricated in Example 2, C1 to C18 and DC1 to DC6, perform high-temperature cycle performance tests. The specific method is: at 45° C., charge the lithium-ion batteries, at a constant current of 0.5 C, to 4.45 V, then charge at a constant voltage of 4.45 V until the current is 0.05 C, and discharge, at a constant current of 0.5 C, to 3.0 V, and repeatedly charge and discharge in such a manner. Calculate capacity retention rate of the lithium-ion batteries after 50, 100, 200 and 300 cycles, respectively.

Capacity retention rate after n cycles=(discharge capacity after $n^{th}$ cycle/discharge capacity after the first cycle)×100%

Use average value of capacity retention rates after n cycles of 5 batteries of the same battery number as the capacity retention rate of said lithium-ion battery after n cycles. The results are listed in Table 3 in FIG. 3.

It can be seen from Table 3 that the lithium-ion batteries C1 to C18 using the technical solution according to the present disclosure have better high-temperature cycle performance, and the batteries DC1 to DC6 that use electrolyte solutions in the comparison example have relatively poor high-temperature cycle performance, indicating that neither separate use of trinitrile/tetranitrile compounds nor combined use of a dinitrile compound adipic dinitrile with a sulfur-oxygen double bond-containing compound and a carbonate additive could achieve a good high-temperature cycle performance. The trinitrile/tetranitrile compounds can demonstrate good high-temperature cycle performance only when combined with a sulfur-oxygen double bond-containing compound.

It can be seen by comparing data of C1 to C5 that, as the PTN content increases, the capacity retention rate increases first and then decreases for the lithium-ion batteries after high-temperature cycles. This is mainly because PTN forms a more effective protective film on the positive electrode surface, and along with the content increase, the protective film is reinforced, which improves the high-temperature cycle performance. But when the content is overly high, the viscosity of the electrolyte solution increases, and the cell becomes more polarized, leading to poor cycles. It can be seen by comparing data of C6 to C9 that, as the MMDS content increases, the capacity retention rate increases first and then decreases for the lithium-ion batteries after high-temperature cycles. This is because the SEI film formed by MMDS is relatively thin and relatively stable, therefore has a lower resistance, which is favorable for improving the capacity retention rate for lithium-ion batteries after high-temperature cycles; however, MMDS itself has a relatively poor stability, and when the SEI film is formed, the remaining MMDS will decompose into organic sulfonate impurities, which detrimentally affects the capacity retention rate of lithium-ion batteries after high-temperature cycles. It can be seen by comparing data of C10 to C14 that the combined use of two types of nitriles with two types of sulfur-oxygen double bond-containing compounds has a better effect on improving the high-temperature cycle performance. This is mainly because the two types of compounds complement each other's film forming and protect each other. It can be seen by comparing data of C15 to C18 that, as the VC content increases, the capacity retention rate increases first and then decreases for the lithium-ion batteries after high-temperature cycles. This is because, when there is more VC, the formed SEI film is thicker and more stable, and as a result, the capacity retention rate increases for the lithium-ion batteries after high-temperature cycles. When there is excess VC, however, it will be oxidized to produce $H_2O$ and $CO_2$, and produce HF by reacting with the lithium salt, which corrodes the positive film and the negative film, leading to the increase of thickness and internal resistance of lithium-ion batteries, as well as more polarized cell. It will instead reduce the capacity retention rate of lithium-ion batteries after high-temperature cycles.

Example 5

Test of Interval Charge Cycles of the Lithium-Ion Batteries

Take 4 of each of the rechargeable lithium-ion batteries fabricated in Example 2, C1 to C18 and DC1 to DC6, perform intermittent charge cycle tests. The specific method is: at 50° C., separately charge the lithium-ion batteries at a constant voltage until the current is 0.05 C, place undisturbed for 20 hours, and then discharge, at a constant current of 0.5 C, to 3.0 V, and charge and discharge in such a manner. Calculate capacity retention rate of the batteries after 10, 30, 50 and 100 cycles, respectively.

Use average value of capacity retention rates after n cycles of 4 batteries of the same battery number as the capacity retention rate of said lithium-ion battery after n cycles. The results are listed in Table 3 in FIG. 3.

It can be seen from Table 3 that the lithium-ion batteries C1 to C18 using the additives according to the present disclosure have better intermittent cycle performance, and the batteries DC1 to DC6 that use electrolyte solutions in the comparison example have relatively poor intermittent cycle performance, indicating that neither separate use of trinitrile/tetranitrile compounds nor combined use of a dinitrile compound adipic dinitrile with a sulfur-oxygen double bond-containing compound and a carbonate additive could achieve a good intermittent cycle performance. The trinitrile/tetranitrile compounds can demonstrate good intermittent cycle performance only when combined with a sulfur-oxygen double bond-containing compound.

It can be seen by comparing data of C1 to C5 that, as the PTN content increases, the capacity retention rate increases first and then decreases for the lithium-ion batteries after intermittent cycles. This is mainly because PTN forms a more effective protective film on the positive electrode surface, and along with the content increase, the protection becomes better, and the capacity retention rate is higher after intermittent charge cycles. But when the content is overly high, the viscosity of the electrolyte solution increases, and the cell becomes more polarized, leading to poor cycles. It can be seen by comparing data of C6 to C9 that, as the MMDS content increases, the capacity retention rate increases first and then decreases for the lithium-ion batteries after intermittent cycles. This is because the SEI film formed by MMDS is relatively thin and relatively stable, therefore has a lower resistance, which is favorable for improving the capacity retention rate for lithium-ion batteries after intermittent cycles; however, MMDS itself has a relatively poor stability, and when the SEI film is formed, the remaining MMDS will decompose into organic sulfonate impurities, which instead affects the capacity retention rate of lithium-ion batteries after intermittent cycles. It can be seen by comparing data of C10 to C14 that the combined use of two types of nitriles with two types of sulfur-oxygen double bond-containing compounds has a better effect on improving the intermittent cycle performance. This is mainly because the two types of compounds complement each other's film forming and protect each other. It can be seen by comparing data of C15 to C18 that, as the VC content increases, the capacity retention rate consistently decreases for the lithium-ion batteries after intermittent cycles. This is because, when there is excess VC, it will be oxidized to produce water and $CO_2$, and produce HF by reacting with the lithium salt, which corrodes the positive film and the negative film, leading to the increase of thickness and internal resistance of lithium-ion batteries, and will instead reduce the capacity retention rate of lithium-ion batteries after intermittent cycles. Although VC can form an effective SEI protective film, intermittent cycles include both high-temperature cycle performance and high-temperature charge performance, and the main factors also include high-temperature storage performance. Since VC will lower high-temperature storage performance, it does not have a significant effect on improving intermittent cycle performance.

In summary, high-temperature storage performance, high-temperature cycle performance and intermittent cycle performance of the lithium-ion batteries using the technical solution according to the present disclosure have all been significantly improved.

Only several embodiments of the present disclosure are described above, which are not limitations in any form to the present disclosure. Although the present disclosure is disclosed with reference with the above preferred embodiments, they are not used to limit the present disclosure. All variations or modifications made by those skilled in the art without departing from the scope of the technical solution according to the present disclosure are equivalent to the embodiments and shall all be encompassed by the scope of the technical solution.

According to the disclosure and description above, those skilled in the art may further make variations and modifications to the above embodiments. Therefore, the present disclosure is not limited by the specific embodiments disclosed and described above. Some equivalent variations and modifications to the present disclosure shall also be encompassed the claims of the present disclosure. Although the Description uses some specific terms, in addition, the terms are used only for the purpose of easy description, which do not constitute any limitation to the present disclosure.

What is claimed is:

1. An electrolyte additive, comprising:
   hexane-1,3,6-tricarbonitrile;
   ethylene sulfate;
   vinylene carbonate; and
   3,3-bis(cyanomethyl)pentane dinitrile.

2. The electrolyte additive of claim 1, further comprising methylene methanedisulfonate.

3. An electrolyte solution, comprising:
   an organic solvent comprising ethyl propionate;
   a lithium salt; and
   an additive comprising:
      hexane-1,3,6-tricarbonitrile;
      ethylene sulfate; and
      vinylene carbonate, wherein a percentage by weight of vinylene carbonate in the electrolyte solution is 0.1% to 1%.

4. The electrolyte solution of claim 3, wherein a percentage by weight of hexane-1,3,6-tricarbonitrile in the electrolyte solution is 0.1% to 4.5%.

5. The electrolyte solution of claim 3, wherein a percentage by weight of ethylene sulfate in the electrolyte solution is 0.1% to 7%.

6. The electrolyte solution of claim 3, wherein the organic solvent further comprises at least two selected from the group consisting of ethylene carbonate, propylene carbonate and diethyl carbonate and wherein the additive further comprises at least one of 3,3-bis(cyanomethyl)pentane dinitrile and methylene methanedisulfonate.

7. The electrolyte solution of claim 3, wherein a percentage by weight of vinylene carbonate in the electrolyte solution is 0.1%.

8. The electrolyte solution of claim 3, wherein a percentage by weight of vinylene carbonate in the electrolyte solution is 0.5%.

9. The electrolye solution of claim 3, wherein a percentage by weight of vinylene carbonate in the electrolyte solution is 1%.

10. A lithium-ion battery comprising:
    an electrolyte solution, the electrolyte solution comprising:
       an organic solvent comprising ethyl propionate;
       a lithium salt; and
    an electrolyte additive, the electrolyte additive comprising:
       hexane-1,3,6-tricarbonitrile;
       ethylene sulfate; and
       vinylene carbonate, wherein a percentage by weight of vinylene carbonate in the electrolyte solution is 0.1% to 1%.

11. The lithium-ion battery of claim 10, wherein the organic solvent further comprises at least two selected from the group consisting of ethylene carbonate, propylene carbonate and diethyl carbonate and wherein the additive further comprises at least one of 3,3-bis(cyanomethyl)pentane dinitrile and methylene methanedisulfonate.

* * * * *